(12) United States Patent  
Guo et al.

(10) Patent No.: US 7,546,555 B2
(45) Date of Patent: Jun. 9, 2009

(54) METHOD AND APPARATUS FOR MATCHING A CONTROL WITH AN ICON

(75) Inventors: Shuang Guo, Cary, NC (US); Hanqi Yang, Apex, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 343 days.

(21) Appl. No.: 11/361,575

(22) Filed: Feb. 24, 2006

(65) Prior Publication Data
US 2007/0204237 A1    Aug. 30, 2007

(51) Int. Cl.
*G06F 3/048* (2006.01)
*G06F 3/02* (2006.01)

(52) U.S. Cl. ........................ 715/864; 715/822
(58) Field of Classification Search ................ 715/822, 715/864
See application file for complete search history.

(56) References Cited

U.S. PATENT DOCUMENTS

2004/0198455 A1   10/2004   Deeds

2005/0190196 A1   9/2005   O'Neil et al.
2005/0275631 A1*  12/2005  Millar et al. ................ 345/170

FOREIGN PATENT DOCUMENTS

| EP | 0872996 A | 10/1998 |
|---|---|---|
| GB | 2323193 A | 9/1998 |
| JP | 2003209610 A | 7/2003 |
| WO | 0203187 A | 1/2002 |
| WO | 2005/116980 A | 12/2005 |

OTHER PUBLICATIONS

International Search Report, International Application No. PCT/US2006/040672, Date of Mailing: Feb. 28, 2008.

* cited by examiner

*Primary Examiner*—Doug Hutton
*Assistant Examiner*—Daeho D Song
(74) *Attorney, Agent, or Firm*—Coats & Bennett, P.L.L.C.

(57) ABSTRACT

A user interface uses color to match icons displayed to the user on a display with one or more corresponding input controls. Text or graphic icons representing functions of a portable electronic device are color coded, and the corresponding input controls are illuminated in the same colors. By using color to match the icons with the associated control(s), the present invention intuitively indicates to the user which controls are associated with a particular icon.

22 Claims, 6 Drawing Sheets

METHOD AND APPARATUS FOR MATCHING A CONTROL WITH AN ICON

BACKGROUND

This invention relates generally to user interfaces for portable hand-held electronic devices, and more particularly, to user interfaces with programmable soft keys.

The design of ergonomic and consumer friendly controls for cellular phones and other portable electronic devices is becoming more challenging with time due to the increasing number of functions and features in such devices, and the limited space available for controls. For example, it is now common to provide cellular telephones that also function as digital cameras, personal digital assistants, and audio playback devices. At the same time, consumers demand smaller devices. It is neither practical, nor desirable, to provide dedicated controls for every available function or feature in a cellular phone. Increasing the number of buttons and other controls adds to the cost, weight, and size of devices. Additionally, a device with numerous controls can be intimidating and/or confusing for many users.

Soft keys are commonly used in cellular phones and other portable electronic devices to reduce the number of controls needed for the user interface. A soft key is a button typically disposed adjacent a display that performs whatever function is currently displayed next to it on the display. The function of the soft key changes depending on context. Since a soft key may perform many different functions depending on the current context, the use of soft keys greatly reduces the number of buttons in a user interface.

While soft keys are versatile, they are not always intuitive and may intimidate some users. As a result, users may shy away from purchasing mobile terminals with soft keys or may ignore soft key features on their mobile terminal.

SUMMARY

A portable electronic device is configured to color-match onscreen icons and corresponding input controls to identify the control correspondence between respective controls and icons. For example, in one or more embodiments, different icons are displayed or otherwise highlighted in different given colors, and matching illumination is used for the corresponding controls to indicate which controls go with which icons. Other lighting effects, such as flashing, pulsing, dimming, etc., may be used to further highlight the relationship between particular controls and onscreen information. For example, the illumination for one or more controls may be flashed on and off to indicate a mandatory user input. Additionally or alternatively, icons may be flashed or otherwise manipulated to indicate mandatory inputs, etc.

DETAILED DESCRIPTION

The present invention relates to user interfaces for portable electronic devices. The user interface has general application in a wide range of electronic devices including without limitation cellular telephones, personal digital assistants, still and video cameras, music players, video players, gaming devices, and audio recording devices. Therefore, the following illustrative embodiments should not be considered as limiting the scope of the claimed invention.

Figure 1:
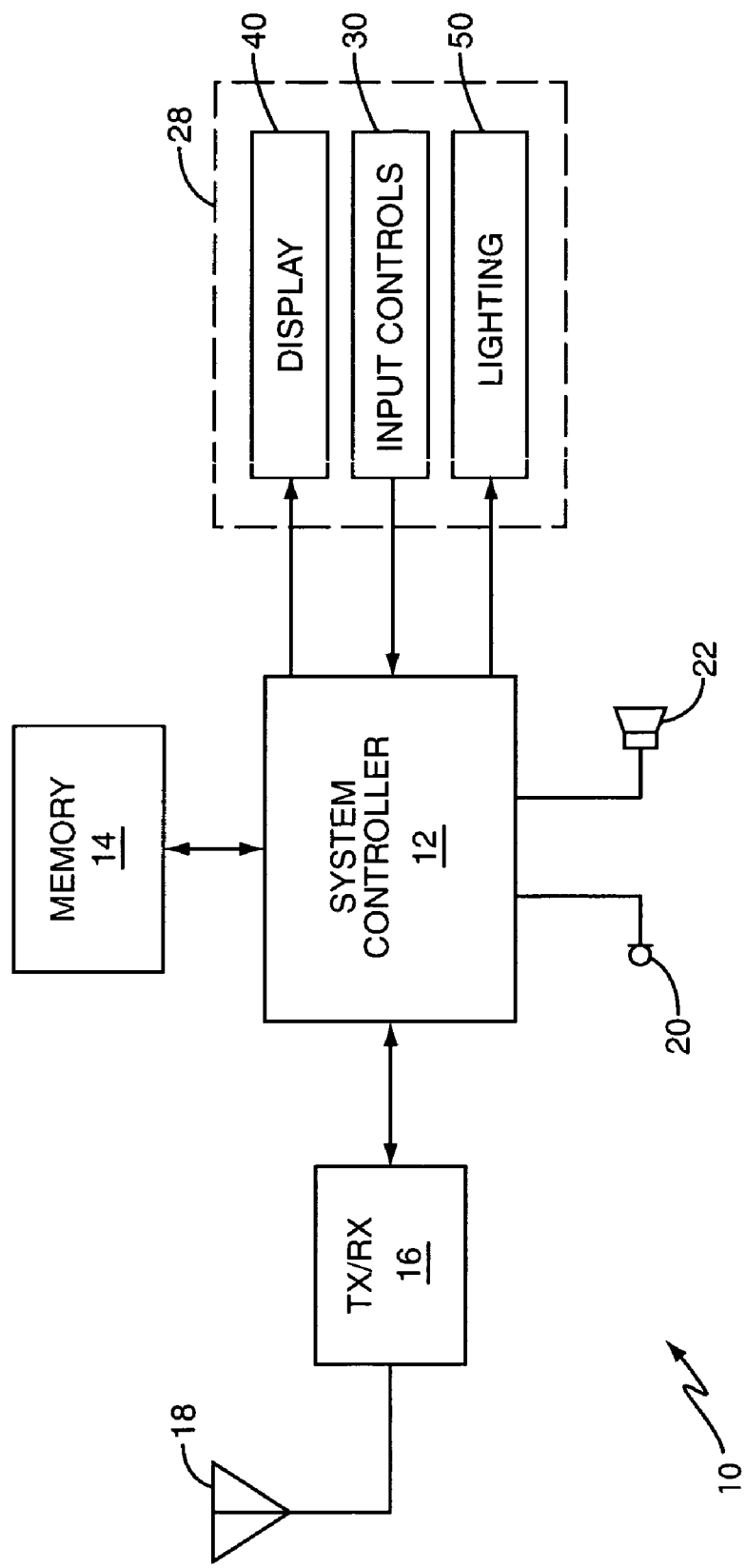
FIG. 1 illustrates a block diagram of an exemplary mobile terminal.

FIG. 1 is a functional block diagram for one exemplary embodiment of the present invention implemented in a mobile terminal 10. The mobile terminal 10 may, for example, comprise a cellular telephone for use in a mobile communication network. The main components of the mobile terminal 10 comprise a system controller 12 to control overall operation of the mobile terminal 10, memory 14 to store program instructions and data needed for operation, a transceiver 16 coupled to an antenna 18 for transmitting and receiving signals, microphone 20 for converting audible signals into electrical audio signals, a speaker 22 for converting electrical audio signals into audible sounds, and a user interface 28 to enable the user to interact with the mobile terminal 10.

User interface 28 includes one or more input controls indicated generally by the numeral 30 for receiving user input, a display 40 to display information for viewing by the user, and one or more lighting elements indicated generally by the numeral 50 for illuminating selected input controls 30. Any known type of input controls 30 for receiving user input may be used including hard and soft keys, programmable keys, dials, joysticks, buttons, thumbwheels, touch pads, etc. Display 40 may comprise a color display, such as a liquid crystal display (LCD) or a touchscreen display that can also be used for user input. The lighting elements 50 may, for example, comprise light emitting diodes (LEDs). The LEDS may be disposed on the input controls 30 or be used as backlighting for the input controls 30. Some input controls 30 may have discretely controllable lighting elements 50 as will be hereinafter explained in detail.

In the various embodiments of the invention described below, lighting elements 50 are used to associate individual input controls 30 with icons displayed on the display 40 to help the user make an association between the icons and the corresponding input control 30. Icons, which may comprise text, graphics or a combination thereof, are displayed on the display 40 and represent functions which the user may select. For some people, it may not be readily apparent which input controls 30 go with which icons.

To address this potential confusion, the mobile terminal 10 is configured to color-match (onscreen) icons and corresponding ones of the input controls 30. Thus, in one or more embodiments, the system controller 12 controls the illumination of the input controls 30 in a manner to suggest to the user that a given input control 30 is associated with a given icon displayed on the display 40. For example, color may be used to match input controls 30 with corresponding icons displayed on the display 40. Icons may be rendered on the display 40 in a particular color and the corresponding input controls 30 may be illuminated with the same color light. Simple icons, such as text icons and simple graphic icons, may be rendered in a selected color. For complex multicolor icons, color for matching the icon with the associated input control 30 can be applied to backgrounds, halo effects, highlights, outlines, etc. Thus, it should be generally understood herein that displaying an icon in a given color may mean actually coloring the icon—text or graphic—but it also may mean broadly applying some type of color-based highlighting to the icon.

Figure 2:
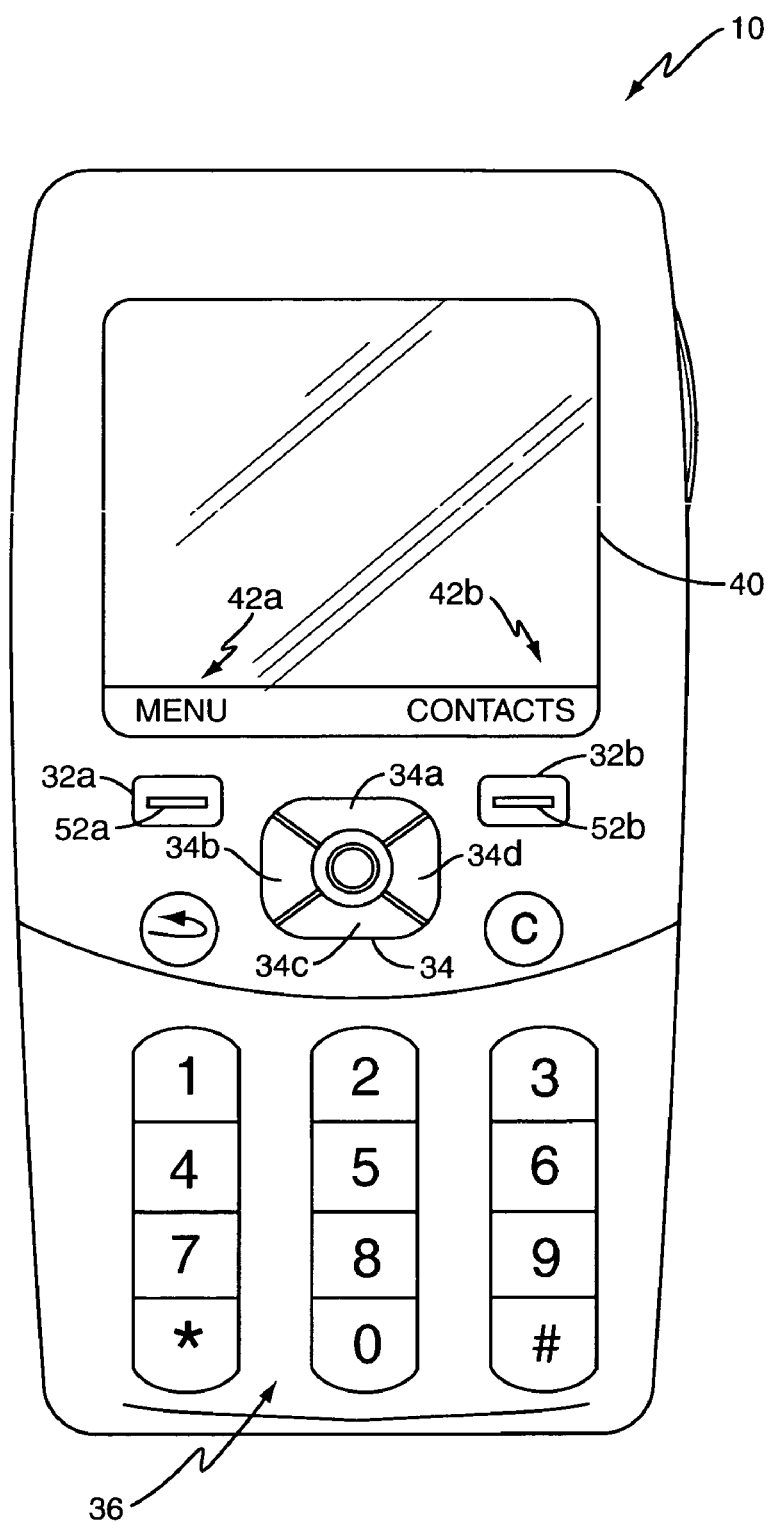
FIG. 2 is an elevational view of an exemplary mobile terminal.

Turning now to FIG. 2, one sees an exemplary embodiment demonstrating how illumination can be used to enhance the user interface. The input controls 30 for the exemplary embodiments shown in FIGS. 2-5 comprise a pair of soft keys 32a and 32b, a navigation control 34 including four navigation buttons 34a-34d, and an alphanumeric keypad 36. The soft keys 32a and 32b are disposed adjacent the display 40. The function of the soft keys 32a, 32b changes depending on the context or circumstances. Display 40 displays icons representing the function(s) of the soft keys 32a, 32b for the current context. In FIG. 2, text icons 42a and 42b are displayed on the display 40 immediately above each soft key 32a, 32b to indicate the functions performed by the soft keys 32, 32b.

For people unfamiliar with the concept of soft keys, it may not be readily apparent that the soft keys 32a, 32b correspond to the icons 42a, 42b. Accordingly, the present invention uses color to associate icons 42a, 42b with the corresponding soft keys 32a, 32b. In the particular embodiment shown in FIG. 2, the text icons 42a, 42b corresponding to the soft keys 32a, 32b are displayed in blue and red respectively. The corresponding soft keys 32a, 32b include lighting elements 52a and 52b to illuminate the soft keys 32a, 32b in the same colors. Lighting elements 52a, 52b may be disposed directly on the soft keys 42a, 42b, or may backlight soft keys 42a, 42b. In this example, the MENU icon 42a is displayed in blue and the lighting element 52a for the corresponding soft key 32a emits blue light. The CONTACTS icon 42b is displayed in red and the lighting element 52b for the corresponding soft key 32b emits a red light. Illuminating the soft keys 32a, 32b with colored light corresponding to the icons 42a, 42b, suggests to the user which soft keys 32a, 32b go with which icons 42a, 42b.

Figure 3:
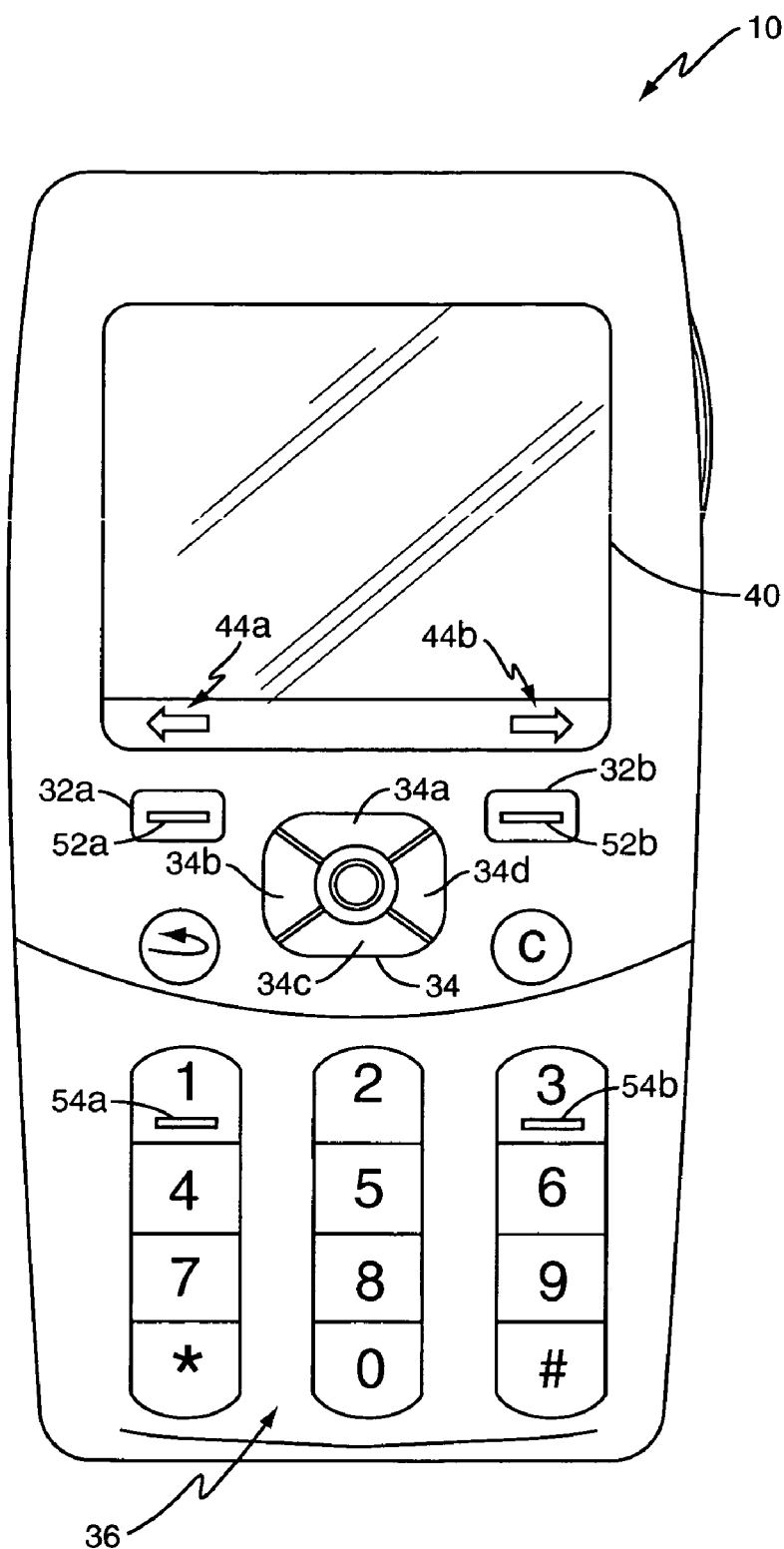
FIG. 3 is an elevational view of an exemplary mobile terminal.
Figure 4:
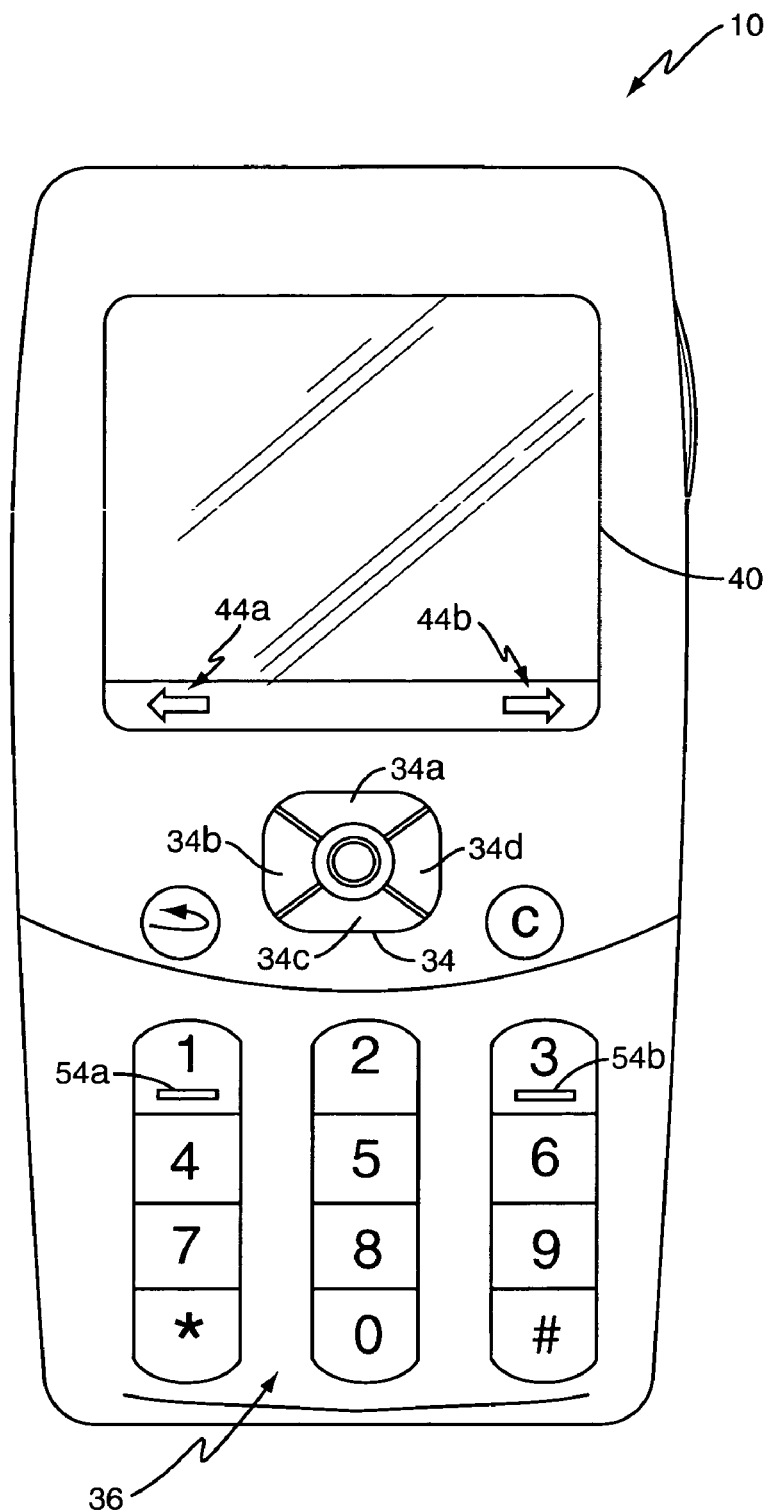
FIG. 4 is an elevational view of an exemplary mobile terminal.

FIG. 3 illustrates an alternate embodiment where more than one input control 30 is available to select an icon. In FIG. 3, the display 40 displays graphic icons 44a, 44b adjacent soft keys 32a, 32b represent BACK and FORWARD functions respectively, which may be used, for example, in a web browsing application. The BACK icon 44a is rendered in blue and the FORWARD icon 44b is rendered in red. The lighting elements 52a, 52b are likewise illuminated with blue and red light respectively so that the user can readily recognize that the "blue" soft key 32a selects the BACK function and the red soft key 32b selects the FORWARD function. Additionally, the "1" and "3" keys on the keypad 36 serve as alternate input controls 30 for selecting the BACK and FORWARD functions respectively. The "1" and "3" keys are illuminated by lighting elements 54a, 54b, respectively, to indicate to the user that the "1" and "3" keys are available to select the BACK and FORWARD functions respectively. The user is thus given the choice to use the soft keys 32a, 32b as primary controls to select the desired function, or the "1" and "3" keys as alternate controls.

Those skilled in the art will appreciate that color matching icons with input controls 30 eliminates the requirement that soft keys be disposed adjacent the display 40. By illuminating a specific input control 30 with a color that matches the color of an icon on the display 40, the present invention enables any input control 30 on mobile terminal 10 to serve as an intuitively related "soft key." In the embodiment shown in FIG. 4, the soft keys 32a and 32b are omitted, and "1" and "3" keys are used as soft keys and are illuminated in red and blue respectively to inform the user that pressing the "1" key will select the BACK function 42 and pressing "3" key will select the FORWARD function.

Figure 5:
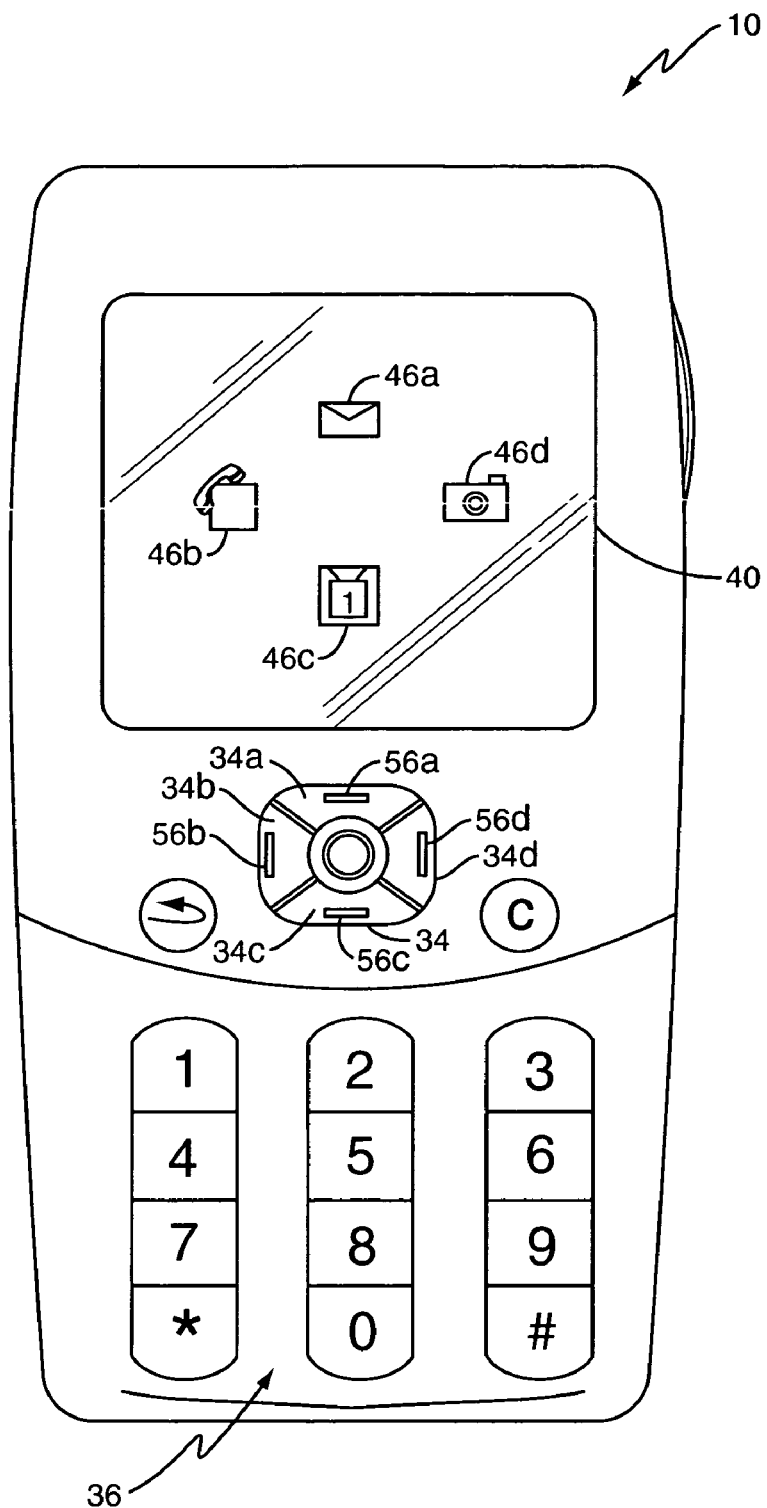
FIG. 5 is an elevational view of an exemplary mobile terminal.

FIG. 5 illustrates another embodiment wherein navigation buttons 44a-44d include lighting elements 56a-56d to associate the navigation buttons 44a-44d with corresponding icons 46a-46d on the display 40. For example, as shown in FIG. 5, display 40 may display icons corresponding to a MESSAGES function 46a, CONTACTS function 46b, CALENDAR function 46c, and CAMERA function 46d in red, green, yellow, and blue, respectively. The navigation control buttons 34a-34d are correspondingly illuminated in red, green, yellow and blue to indicate to the user which navigation buttons are used to select which functions. Specifically, the top navigation button 34a is illuminated in red to indicate to the user that it selects the MESSAGES function 46a, the left navigation button 46b is illuminated in green to indicate to the user that it selects the CONTACTS function 46b, the bottom navigation button 46c is illuminated in yellow to indicate to the user that it selects the CALENDAR function 72, and right navigation button 46d is illuminated in blue to indicate to the user that it selects the CAMERA function 46b. Note that display 40 of FIG. 5 displays different functions in the same general orientation as the controls on navigation control 34, but those skilled in the art will appreciate that the color matching described herein enables display 40 to display the functions in any desired orientation, while still using color-matching to intuitively link selected ones of the controls 30 with particular icons presented on the display 40.

In addition to color matching, the mobile terminal 10 may be configured to use light effects to alert its user when a mandatory input by the user is required, such as a dialog prompting the user for a YES or NO response. For example, lighting elements 50 for active ones of the input controls 30 may be flashed on and off intermittently. Referring back to FIG. 2, one or both the lighting elements 52a, 52b for the soft keys 32a, 32b may be flashed or pulsed when a mandatory response is required. In this situation, illumination for inactive or unrelated ones of the input controls 30 can be turned off to save battery power and/or make input control more intuitive.

Further, other light effects in lieu of or in addition to flashing can be used to indicate when mandatory input is required. In general, any characteristic of the light can be varied to indicate when mandatory input is required. For example, the color or intensity of the light can be varied when mandatory user input is required. Sound effects and tactile effects can also be used to indicate when mandatory user input is required.

The colors used to match input controls 30 with corresponding functions may be preset by the manufacturer or service provider. Alternatively, the colors for matching input controls 30 with corresponding icons may be one of a number of user preferences that can be set by the user through on-screen menus as is well-known in the art. Also, the color of one or more of the input controls 30 may be fixed—e.g., always red or always blue, etc.—such that a particular icons can be visually linked to a fixed-color input control by selecting that fixed color for displaying the icon. In other embodiments, one or more of the input controls 30 can be illuminated in different colors, such that the colors used for icons and used for the controls both can be varied.

Figure 6:
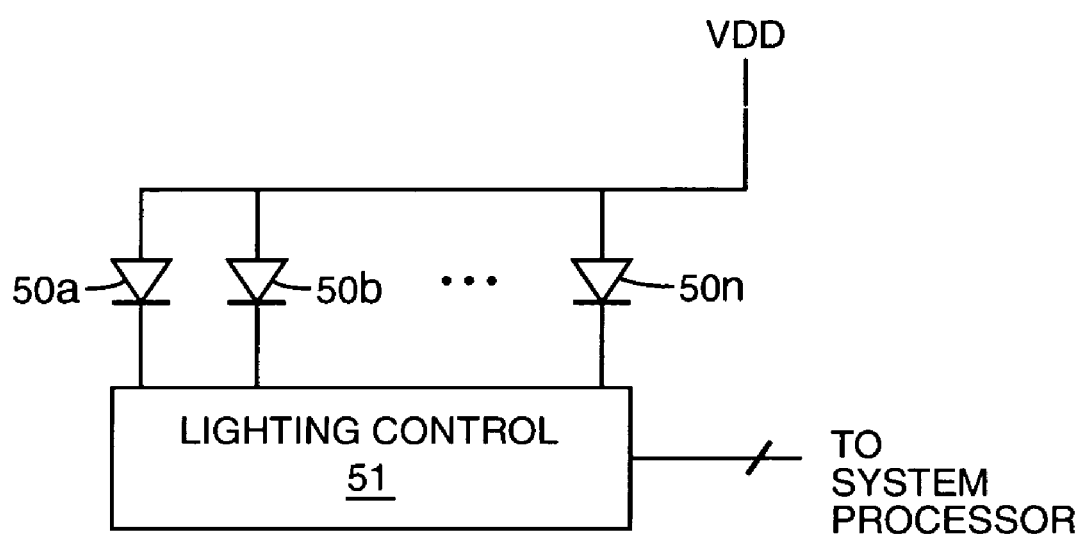
FIG. 6 illustrates a block diagram of exemplary lighting elements.

FIG. 6 illustrates an exemplary control arrangement for controlling lighting elements 50. The lighting elements 50 for illuminating input controls 30 may comprise any known light source or sources, including LEDs, which may be Organic LEDs (OLEDs), Polymer LEDs (PLEDs), etc. Indeed, the lighting elements 50 may include a mix of lighting technologies, such as discretely controllable LEDs for selected ones of the input controls 30, thereby providing for color matching, flashing, and other controllable illumination effects, in combination with other lighting elements, such as LED arrays and/or fluorescent or electroluminescent elements. Any one or more of the lighting elements may be may be a monochromatic or multi-color light source. For example, multicolor LEDs may be used for one or more input controls 30, such that those controls can take on different colors or a desired range of colors. Non-limiting examples of multi-color LEDs include some types of PLEDs, which display different colors depending on the direction of the current applied to a control pin. Still other LEDs include multiple pins, where each pin controls a different colored LED chip.

By way of non-limiting example, FIG. 6 illustrates at least a portion of the lighting elements 50, wherein one sees a number of LEDs (50a-50n), which interface to the system controller 12 directly, or through appropriate interface circuits 51. Such circuits may comprise simple transistor-based drive circuits that allow for direct control of individual ones of the LEDs 50a-50n by the system controller 12. For example, the system controller 12 may have bit I/O lines that can be dedicated to lighting control, and such lines can provide simple on/off control, or more sophisticated modulation/pulsing control, and color selection. As a non-limiting alternative, the interface circuits 51 may comprise one or more LED control circuits providing discrete control lines, or a serial or parallel interface (bused or non-bused), through which the system controller 12 effects desired lighting control. In still other embodiments, lighting elements 50 may be incorporated into a control array—e.g., a keypad—and control scanning and lighting control may be accomplished by signaling between the control array and the system controller 12.

With these and other implementation options in mind, it will be broadly understood that the present invention uses color to match icons with one or more illuminated controls. Color matching particular input controls 30 with displayed icons intuitively identifies to the user which controls go with which icons and thus increases the friendliness and ease of use of the mobile terminal 10. In addition, by using the color matching techniques described herein, manufacturers will have more flexibility in locating controls. The use of illumination to relate input controls 30 to (screen) icons can be applied not only to soft keys, but to any type of input control, including hard keys, buttons, dials, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

We claim:

1. A method implemented in a portable electronic device for prompting a user for input, the method comprising:
   displaying an icon on a display in a given color; and
   illuminating an input control associated with the icon in the same given color to match the illuminated input control with the icon,
   wherein illuminating the input control comprises illuminating a primary input control and an alternate input control associated with the icon in the given color.

2. The method of claim 1 further comprising applying a light effect to the illuminated control to indicate when mandatory user input is required.

3. The method of claim 2 wherein applying a light effect to the illuminated control comprises flashing the illuminated control intermittently.

4. The method of claim 2 wherein applying a light effect to the illuminated control comprises varying a characteristic of the illumination.

5. The method of claim 4 wherein varying a characteristic of the illumination comprises changing at least one of the color and intensity of the illumination.

6. The method of claim 2 further comprising turning off illumination of unavailable or unrelated controls.

7. The method of claim 1 further comprising flashing the icon on the display to indicate when mandatory user input is required.

8. The method of claim 1 further comprising changing an appearance of the icon on the display to indicate when mandatory user input is required.

9. The method of claim 1 further comprising setting the given color responsive to a configuration selection by a user.

10. The method of claim 1 wherein the input control comprises one of a key, button, joystick, dial, thumbwheel, and touch pad.

11. The method of claim 1 further comprising displaying two or more icons in different colors and illuminating two or more input controls in respective colors to match the input controls with corresponding icons.

12. A portable electronic device comprising:
    a display;
    at least one illuminated input control for receiving user input; and
    a processor configured to control display of an icon on said display, said processor configured to display the icon in a given color and to associate the icon with corresponding illuminated input controls, wherein both a primary input control and an alternate input control associated with the icon are illuminated with the given color.

13. The electronic device of claim 12 wherein said processor is further configured to apply a light effect to one or more illuminated controls to indicate when mandatory user input is required.

14. The electronic device of claim 13 wherein the processor is configured to flash an illuminated control intermittently to indicate that mandatory user input is required.

15. The electronic device of claim 13 wherein the processor is configured to vary a characteristic of the illumination for one or more illuminated input controls to indicate that mandatory user input is required.

16. The electronic device of claim 15 wherein the processor changes at least one of the color and intensity of the illumination for one or more illuminated input controls to indicate that mandatory user input is required.

17. The electronic device of claim 13 wherein the processor is further configured to turn off illumination of unavailable or unrelated controls.

18. The electronic device of claim 12 wherein the processor is configured to flash the icon on the display to indicate when mandatory user input is required.

19. The electronic device of claim 12 wherein the processor is configured to change an appearance of the icon on the display to indicate when mandatory user input is required.

20. The electronic device of claim 12 wherein the processor is configured to display the icon in a user-selected color.

21. The electronic device of claim 12 wherein the input control comprises one of a key, button, joystick, dial, thumbwheel, and touch pad.

22. The electronic device of claim 12 wherein the processor is configured to display two or more icons in different colors and illuminate two or more input controls in respective colors to match the input controls with corresponding icons.

* * * * *